No. 733,169. PATENTED JULY 7, 1903.
T. E. DEVONSHIRE.
TROUGH OR CONDUIT FOR UNDERGROUND ELECTRIC CABLES.
APPLICATION FILED NOV. 8, 1902.
NO MODEL. 4 SHEETS—SHEET 1.
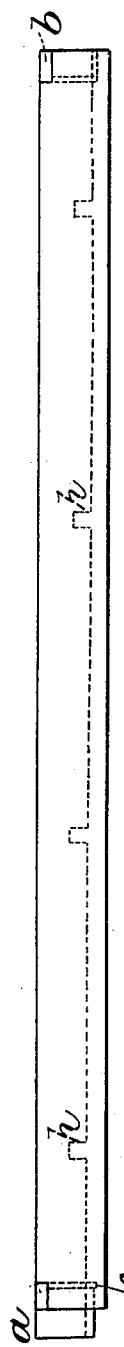
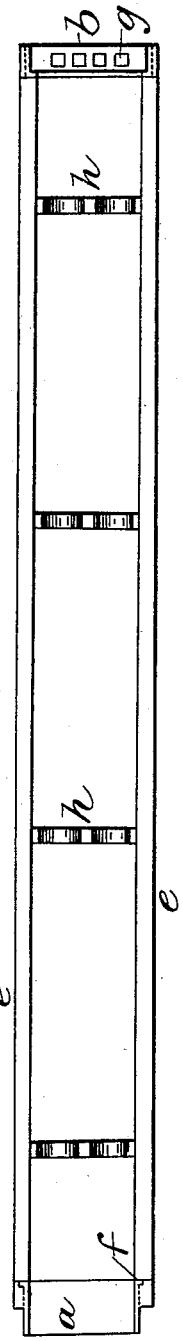
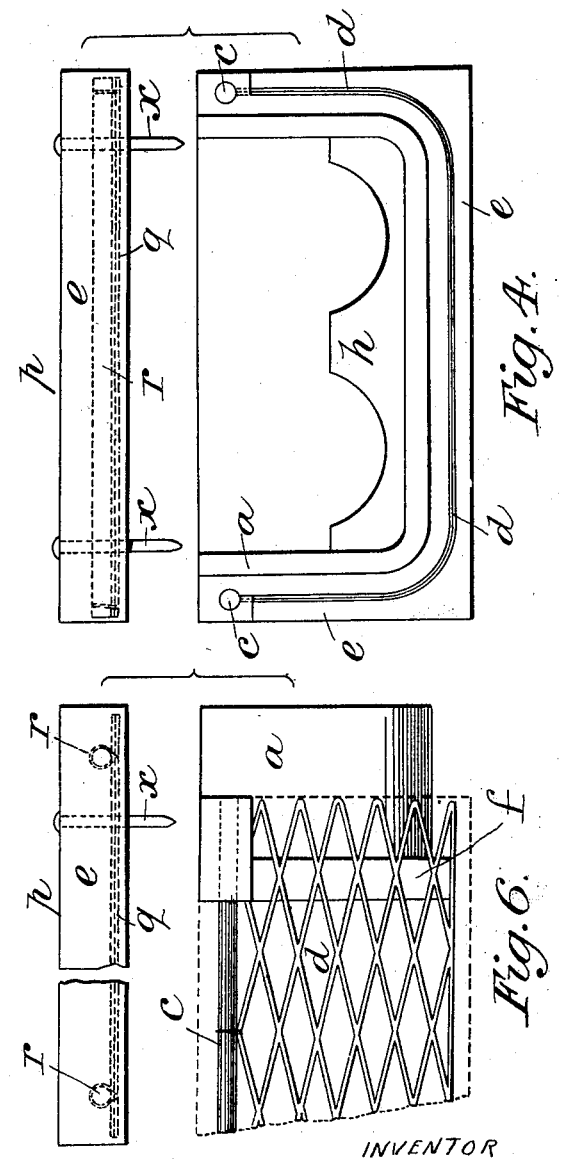
WITNESSES:
F. W. Wright
E. W. Collins
INVENTOR
THOMAS E. DEVONSHIRE
BY Howson and Howson
HIS ATTORNEYS No. 733,169. PATENTED JULY 7, 1903.
T. E. DEVONSHIRE.
TROUGH OR CONDUIT FOR UNDERGROUND ELECTRIC CABLES.
APPLICATION FILED NOV. 8, 1902.
NO MODEL. 4 SHEETS—SHEET 2.
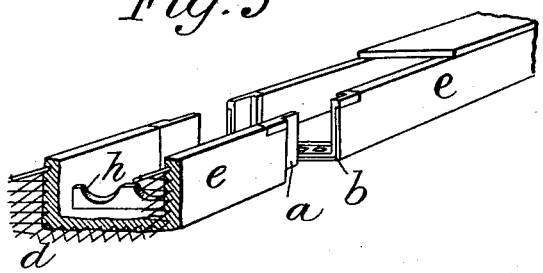
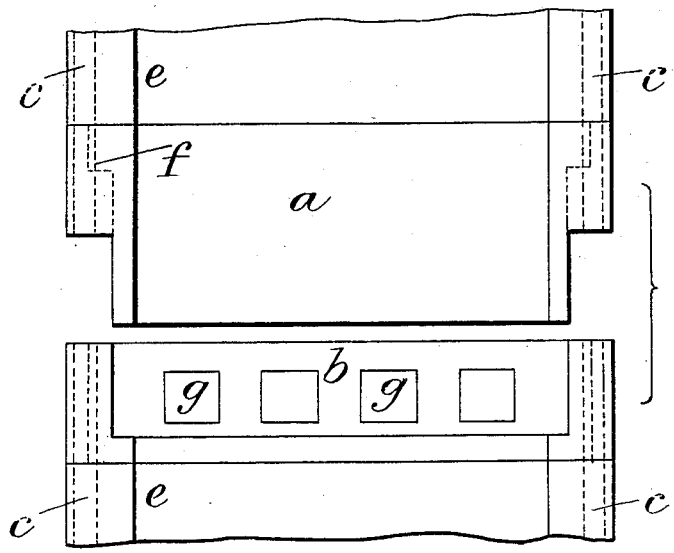

No. 733,169. PATENTED JULY 7, 1903.
T. E. DEVONSHIRE.
TROUGH OR CONDUIT FOR UNDERGROUND ELECTRIC CABLES.
APPLICATION FILED NOV. 8, 1902.
NO MODEL. 4 SHEETS—SHEET 3.
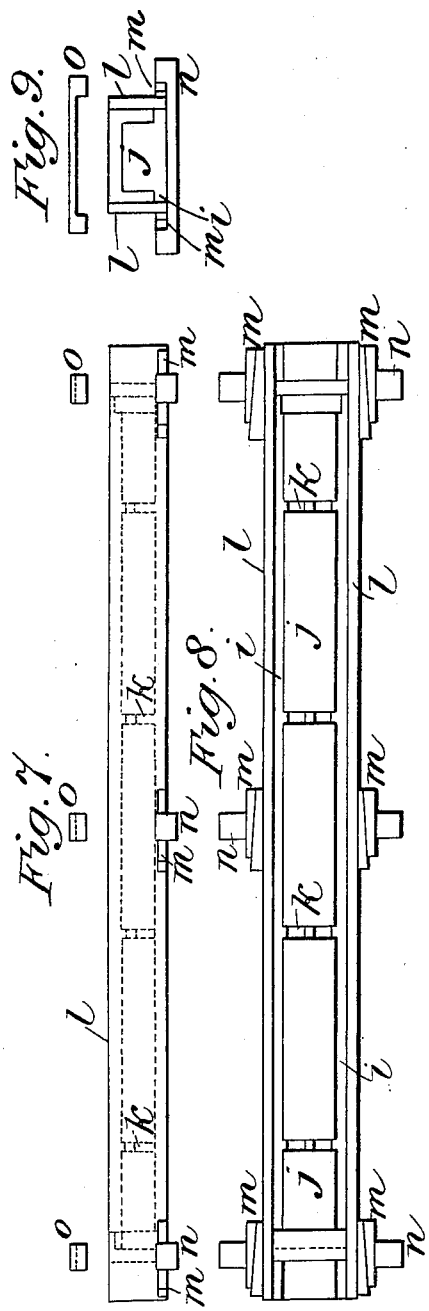
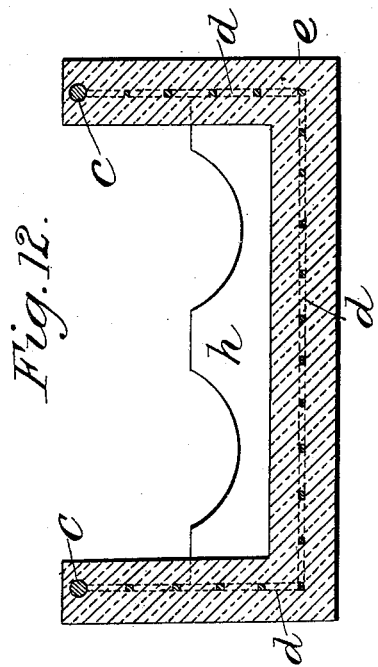
WITNESSES:
P.W.Wright
E. W. Collins
INVENTOR
THOMAS E. DEVONSHIRE
BY
Howson and Howson
HIS ATTORNEYS.

No. 733,169. PATENTED JULY 7, 1903.
T. E. DEVONSHIRE.
TROUGH OR CONDUIT FOR UNDERGROUND ELECTRIC CABLES.
APPLICATION FILED NOV. 8, 1902.
NO MODEL. 4 SHEETS—SHEET 4.
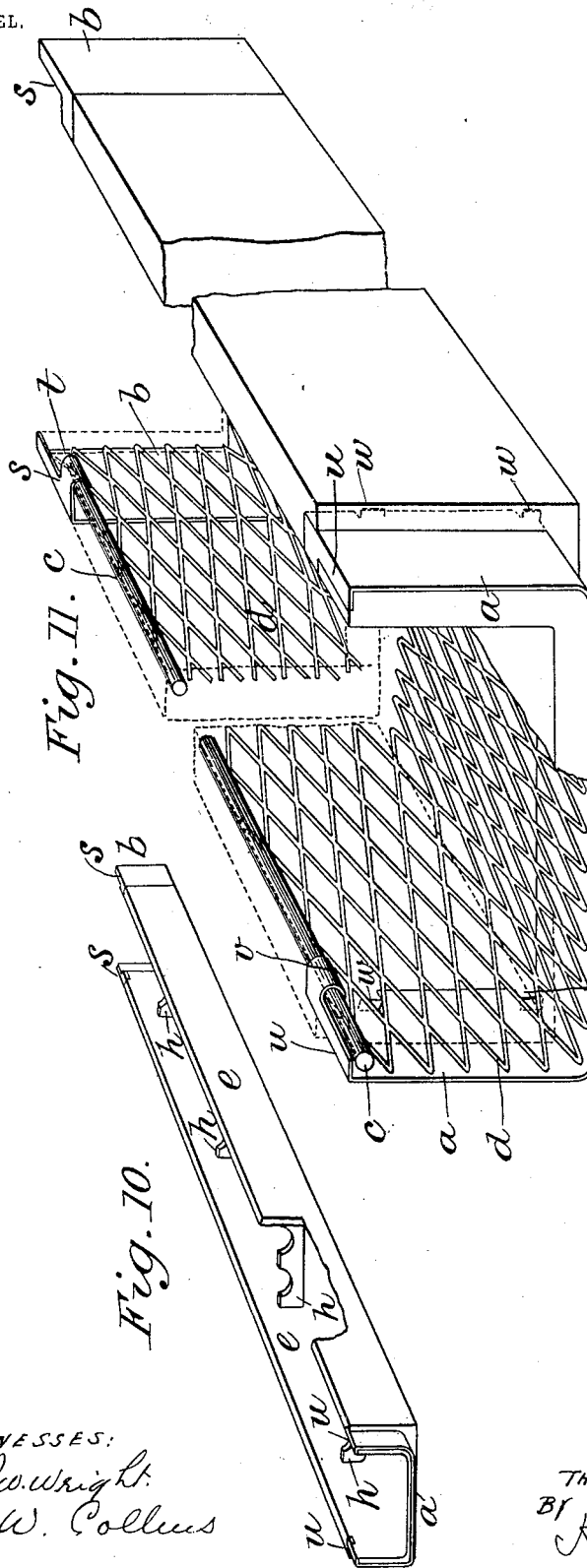
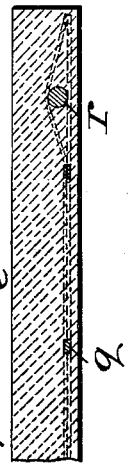
WITNESSES:
P. W. Wright.
E. W. Collins
INVENTOR
THOMAS E. DEVONSHIRE
BY Howson and Howson
HIS ATTORNEYS No. 733,169. Patented July 7, 1903.

UNITED STATES PATENT OFFICE.

THOMAS EASTON DEVONSHIRE, OF CHISLEHURST, ENGLAND.

TROUGH OR CONDUIT FOR UNDERGROUND ELECTRIC CABLES.

SPECIFICATION forming part of Letters Patent No. 733,169, dated July 7, 1903.

Application filed November 8, 1902. Serial No. 130,511. (No model.)

*To all whom it may concern:*

Be it known that I, THOMAS EASTON DEVONSHIRE, a subject of the King of Great Britain and Ireland, residing at Perbright, Chislehurst, in the county of Kent, England, have invented certain new and useful Improvements in Troughs or Conduits More Especially Intended for Underground Electric Cables, of which the following is a specification.

My invention has for its object to provide troughs or conduits made of a combination of concrete and metal, as hereinafter described, which troughs or conduits are economical in first cost and strong and durable. The said troughs or conduits are more especially intended for carrying and protecting electric cables; but they can be employed for any other purpose to which they are applicable.

Under the expression "concrete" in this specification and in the claims I include any such mixtures of cement, mortar, lime, gypsum, bitumen, or other binding material with sand, gravel, cinders, sawdust, or the like capable of forming a mixture which can be cast or molded around metal, as hereinafter described.

According to my invention I make the U or equivalently shaped lengths (which when put together in line form the troughing or conduit) of a network or core of perforated, reticulated, or "expanded" metal in connection with metal ends, and I place this metal construction in a mold, and I mold or cast concrete around it, so as to form the body of the length of troughing or conduit, the metal ends being so shaped that the concrete engages with them and the ends of adjacent lengths engage together when put in place. The covers of the troughs or conduits may be made of lengths consisting of a network or core of metal with concrete molded or cast around it, and the said lengths can be held in place by pins passed through them or projecting from their under side and passed into the bituminous matter with which the trough or conduit is filled after the cables are in place when the said trough or conduit is used for electric cables.

I will describe with reference to the accompanying drawings constructions in accordance with my invention.

Figure 1 is a side elevation, and Fig. 2 a plan, of a length of trough made in accordance with my invention. Fig. 3 is a perspective view of parts of two adjacent lengths of trough. Fig. 4 is an end view drawn to a larger scale, and Fig. 5 shows in plan the ends of adjacent lengths. Fig. 6 shows the metal construction at one end. Above Figs. 4 and 6 the cover is shown in end view and side view, respectively. Fig. 7 is a side elevation, Fig. 8 is a plan, and Fig. 9 is an end end view, of a mold for molding the concrete around the metal construction. Fig. 10 is a perspective view of a modification. Fig. 11 is a perspective view; and Fig. 12 is a cross-section drawn to a larger scale, part of the concrete being removed from Fig. 11 to show the metal construction. Figs. 13 and 14 show in longitudinal section and end elevation, respectively, a modification in the metal construction of the cover.

Referring first to the construction shown in Figs. 1 to 6, at a suitable distance apart to form the respective ends of the length of troughing or conduit I place U-shaped metal end pieces or castings $a$ and $b$, formed so that they can engage with the end pieces of adjacent lengths as spigot and socket or male and female joints. These are connected together by rods $c$ at the upper ends of the said U-shaped metal end pieces. Then iron or steel network or what is known as "expanded metal" $d$ is bent or formed into a U shape corresponding to the exteriors of the aforesaid end pieces $a$ and $b$, the said network or expanded metal $d$ extending at each end around the exteriors of the end pieces $a$ and $b$ and being of a length in accordance with the length of troughing or conduit being made. The upper edges of the said network or expanded metal $d$ are secured to the aforesaid rods $c$ by wire or in other convenient manner. Around the framework of metal thus made the concrete $e$ is molded or cast, so as to form a length of troughing or conduit of the requisite thickness, the said concrete passing through the reticulation of or openings in the network or expanded metal $d$ and becoming affixed to the end pieces $a$ and $b$ by engaging with projections thereon or recesses or openings therein—for example, a flange or flanges on the spigot or male end, as shown at *f*, and openings through the socket or female end, as shown at *g*. In place of the ordinary wooden supports or bridges hitherto used the concrete may be cast or molded, with projections *h* from its interior constituting supports or bridges and adding to the rigidity of the construction. A convenient way of molding the concrete around the metal is to secure the two end pieces *a* and *b* in an inverted position to a board *i*, (see Figs. 7, 8, and 9,) provided with a ridge or projection *j*, corresponding to the interior of the length of troughing or conduit to be made, (the said ridge or projection being provided with recesses *k* for the formation of the supports or bridges *h* if they are to be of concrete.) The said end pieces *a* and *b* are connected by the rods *c* with the network or expanded metal *d*, secured thereto, and then I erect two side pieces *l*, corresponding to the external sides of the length of troughing or conduit to be formed, and secure these below by wedges *m*, driven in between the said side pieces *l*, and projections from under saddle-pieces *n* and above by upper saddle-pieces *o*. (Shown above Figs. 7 and 9 and not shown in Fig. 8.) The concrete is then rammed in to form a length of trough of the requisite thickness with the network or expanded metal *d* and the rods *c* embedded therein and the end pieces *a* and *b* secured or keyed in place by the concrete. If the covers *p* are to be made as aforesaid, the network or expanded metal *q* can be tied or otherwise secured to transverse rods *r* to keep the said network or expanded metal flat, the concrete *e* being molded or cast to the requisite thickness, so that the metal rods *r* and network or expanded metal *q* are embedded in the said concrete. *x* represents pins for penetrating the bituminous filling of the trough, as aforesaid.

Figs. 13 and 14 illustrate a modification in which in place of the network or expanded metal *q* being tied to the rods *r* the said rods are passed through interstices of the reticulations of the network or expanded metal *q*, or the rods may be dispensed with. When expanded metal is used, the longer axis of its meshes should be arranged lengthwise of both the trough or conduit and the covers *p*. The covers *p* can be secured in place on the troughing or conduit by projections or pins entering the bitumen filling of the trough or conduit, as aforesaid. Intermediate U-shaped pieces of metal may be used between the two end pieces *a* and *b*, if desired, and I may use an additional metal rod or additional metal rods, such as *r*, extending between the end pieces in a position or positions in the U-shaped metal structure between the two rods *r* aforesaid, if desired.

When it is desired that no metal or practically no metal shall appear at the internal surface of the trough or conduit, the arrangements may be modified, as illustrated in Figs. 10, 11, and 12. In this modification instead of using metal castings for the end pieces *a* and *b* I use pieces of sheet metal bent to the required form. At the socket end the U-shaped metal piece *b* is somewhat wider than the depth of the socket and follows the external contour of the body of the trough. The metal is bent over at *s* at right angles, and a portion corresponding to the depth of the socket is cut away, so that its inner edge is flush with the inner face of the socket. The remaining part of the bent-over part is bent under, as shown at *t* in Fig. 11. At the spigot end of the trough the U-shaped metal piece *a* is somewhat wider than the length of the spigot and follows the contour of the exterior of the spigot and is bent over at right angles at *u*, so as to form a protection, part being cut away, as shown, the remainder being bent under, as at *v*, as in the case of the socket end metal piece *b*. The metal rods *c* enter the curved portions *v t* of the respective metal end pieces *a* and *b* in which they lodge, the ends of the said rods at the socket part *b* being flush with the back face of the socket, but the other ends extending, if desired, through the curved part *v* of the metal end piece *a*, as shown. A sheet of expanded metal or similar metal network *d* bent to the required shape is wired or otherwise attached to the rods *c* and is inserted at its two ends into the metal end pieces *a* and *b*, as shown in Fig. 11. The inner face of the metal end piece *b* not being in the same plane as that of the metal end piece *a*, the metal network or expanded metal is splayed out at the socket end, so as to lie close to the metal end piece *b*. The rods *c* may be dispensed with, if desired, in which case the curved portions *v t* of the metal end pieces *a* and *b* may be curved over to a greater extent or bent downward, so as to grip the concrete molded around the metal. To further incorporate the metal end pieces *a* and *b* in the body of the trough, these pieces may be cut and bent over, so as to form hooks engaging with the concrete, as indicated, for example, at *w*.

In cases where, instead of molding the bridges *h* in the concrete itself, it is desired to use already-formed bridges composed of insulating material—such, for example, as glass, porcelain, or the like—the said bridges can be placed in position in the mold before introducing the concrete, and holes may be left near the outer edges of such insulating-bridges *h*, through which pins or wires may be threaded, so as to form a further attachment to the concrete, or the said insulating-bridges may be made with jagged or roughened edges, which will serve the same purpose, or they may be wired, hooked, or otherwise fastened to the metal network or expanded metal D.

For fixing the covers *p* in place in cases where the trough is filled up with bitumen or pitch the holes and pins may be dispensed with and the under surface of the cover be molded or cast with a roughened or corrugated surface, the cover being pressed down onto the bitumen or pitch filling of the trough while it is still hot, so that the corrugations or roughened surfaces of the cover grip the bitumen or pitch filling.

In the claims by the term "U-shaped" I intend to include any trough so shaped as to have an open top, two sides, and a bottom. By the term "perforated metal" I wish to include reticulated or expanded metal or other obvious equivalents.

I claim as my invention—

1. Lengths of trough or conduit made of U-shaped metallic engaging spigot and socket ends, with perforated metal extending from end to end, this metal structure being embedded in concrete molded therearound so as to form a U-shaped length, the perforated metal being also secured to the U-shaped metallic engaging spigot and socket ends, substantially as described.

2. Lengths of trough or conduit made of U-shaped metallic engaging spigot and socket ends, rods connecting them together, and perforated metal extending from end to end, this metal structure being embedded in concrete molded therearound so as to form U-shaped lengths, substantially as described.

3. Lengths of trough or conduit made of U-shaped end pieces, rods connecting them at their upper ends and perforated metal, connected to the rods and extending at each end around the end pieces and with concrete molded around the metal parts, and engaging therewith, so as to form U-shaped lengths, substantially as described.

4. Lengths of trough or conduit made of U-shaped metal engaging ends formed with flanges or recesses and rods connecting said ends at their upper parts, to which rods perforated metal is secured, the said perforated metal being shaped to correspond with the end pieces and extending from end to end, concrete being molded on the said parts so as to form a length of U-shaped trough or conduit in which the metal parts are keyed and embedded, substantially as described.

In testimony whereof I affix my signature in presence of two witnesses.

THOMAS EASTON DEVONSHIRE.

Witnesses:
 WILLIAM GERALD REYNOLDS,
 WILLIAM JOHN WEEKS.